United States Patent
Tung

(10) Patent No.: US 10,476,353 B1
(45) Date of Patent: Nov. 12, 2019

(54) MOTOR NUMBERING METHOD, AUTOMATIC CONTROL DEVICE, AND RECORDING MEDIUM

(71) Applicant: New Era AI Robotic Inc., Taipei (TW)

(72) Inventor: Chi-Chang Tung, Taipei (TW)

(73) Assignee: New Era AI Robotic Inc., Taipei (TW)

( * ) Notice: Subject to any disclaimer, the term of this patent is extended or adjusted under 35 U.S.C. 154(b) by 0 days.

(21) Appl. No.: 16/132,471

(22) Filed: Sep. 17, 2018

(30) Foreign Application Priority Data

Jun. 20, 2018 (TW) ................... 107121089

(51) Int. Cl.
*H02K 11/21* (2016.01)
*G05B 19/408* (2006.01)

(52) U.S. Cl.
CPC ........... *H02K 11/21* (2016.01); *G05B 19/408* (2013.01)

(58) Field of Classification Search
CPC .................................................... G05B 13/024
USPC ....................................................... 318/34, 53
See application file for complete search history.

(56) References Cited

U.S. PATENT DOCUMENTS 5,778,138 A * 7/1998 Ishimoto ............ G11B 15/1875
386/263
7,649,378 B1 1/2010 Cawthorne et al.

FOREIGN PATENT DOCUMENTS

DE 112015006392 12/2017
EP 3151415 4/2017

OTHER PUBLICATIONS

"Search Report of Europe Counterpart Application", dated May 3, 2019, p. 1-p. 9.

* cited by examiner

*Primary Examiner* — David Luo
(74) *Attorney, Agent, or Firm* — JCIPRNET

(57) ABSTRACT

A motor numbering method, an automatic control device, and a recording medium suitable for numbering a plurality of motor units of the automatic control device are provided. The motor numbering method includes the following steps: specifying a target number; scanning a plurality of motor numbers to record a plurality of rotation data of the motor units; selecting one of the rotation data having a rotation value satisfied a preset rotation condition, and determining whether the rotation value of the one of the rotation data is greater than a preset threshold value; and changing the motor number of the motor unit corresponding to the one of the rotation data to the target number when the rotation value of the one of the rotation data is greater than a preset threshold value.

15 Claims, 4 Drawing Sheets

MOTOR NUMBERING METHOD, AUTOMATIC CONTROL DEVICE, AND RECORDING MEDIUM

CROSS-REFERENCE TO RELATED APPLICATION

This application claims the priority benefit of Taiwan application serial no. 107121089, filed on Jun. 20, 2018. The entirety of the above-mentioned patent application is hereby incorporated by reference herein and made a part of this specification.

BACKGROUND

Technical Field

The present invention relates to a numbering method, and more particularly to a motor numbering method, an automatic control device, and a recording medium.

Description of Related Art

In recent years, as the development of automatic control devices grow more diverse, various types of automatic control devices are designed in various fields and examples of automatic control devices can be robots, robotic arms, mechanical organisms, etc. Through a plurality of motor units in a joint portion, the automatic control device can perform flexible actions. However, for a control program of the automatic control device, a number of these motor units must correctly correspond to the respective positions on the automatic control device, so that a plurality of control commands in the control program can correctly correspond to the motor units. If not, an error would occur in the operation of the automatic control unit. In view of this, several solutions are proposed below for writing the control program to correctly and efficiently number these motor units so that the automatic control device can correctly execute the control program.

SUMMARY

The present invention provides a motor numbering method, an automatic control device, and a recording medium that can provide a convenient and efficient motor numbering effect.

A motor numbering method of the present invention is adapted to number a plurality of motor units of an automatic control device. The motor numbering method includes: specifying a target number; scanning a plurality of motor numbers to record a plurality of rotation data of the plurality of motor units; selecting one of the plurality of rotation data having a rotation value satisfied a preset rotation value condition and determining whether the rotation value of the one of the plurality of rotation data is greater than a preset threshold value; and when the rotation value of the one of the plurality of rotation data is greater than the preset threshold value, changing the motor number of the motor unit corresponding to the one of the plurality of rotation data to the target number.

An automatic control device of the present invention includes a plurality of motor units and the controller. The controller is coupled to the plurality of motor units. The controller specifies a target number and scans a plurality of motor numbers to record a plurality of rotation data of the plurality of motor units. The controller selects one of the plurality of rotation data having a rotation value satisfied a preset rotation value condition, and determines whether the rotation value of the one of the plurality of rotation data is greater than a preset threshold value. When the rotation value of the one of the plurality of rotation data is greater than the preset threshold value, the controller changes the motor number of the motor unit corresponding to the one of the plurality of rotation data to the target number.

A non-transitory computer readable recording medium of the present invention includes a program for reading by a controller of an automatic control device to perform a motor numbering operation. The motor numbering operation includes: specifying a target number; scanning a plurality of motor numbers to record a plurality of rotation data of a plurality of motor units; selecting one of the plurality of rotation data having a rotation value satisfied a preset rotation value condition and determining whether the rotation value of the one of the plurality of rotation data is greater than a preset threshold value; and when the rotation value of the one of the plurality of rotation data is greater than the preset threshold value, changing the motor number of the motor unit corresponding to the one of the plurality of rotation data to the target number.

Based on the above, the motor numbering method, the automatic control device, and the recording medium of the present invention uses the rotation of one or more motor units set by a user to change the motor number of a specific motor unit to the target number. That is to say, during the motor numbering, the user can conveniently and correctly number the specific motor unit.

To make the aforementioned features and advantages more comprehensible, several embodiments accompanied with drawings are described in detail as follows.

DESCRIPTION OF THE EMBODIMENTS

Figure 1:
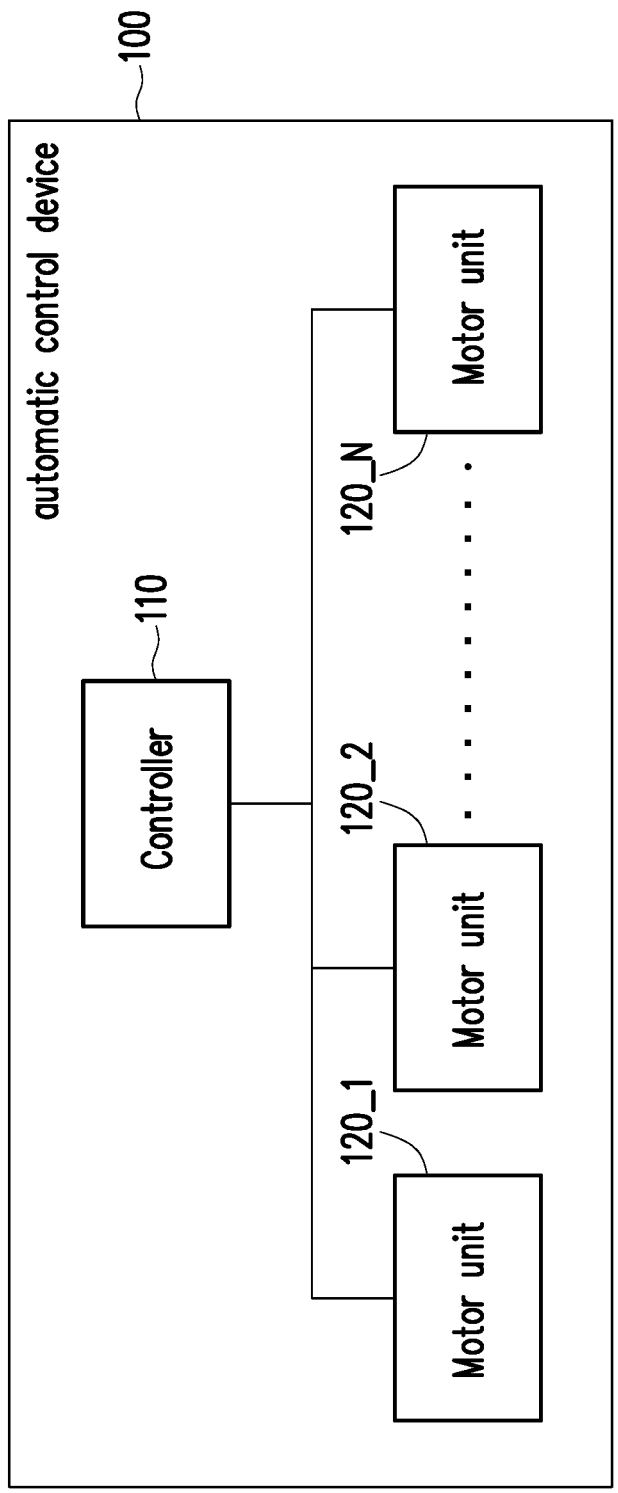
FIG. 1 is a schematic diagram of an automatic control device in accordance with an embodiment of the present invention.

In order to make the content of the present invention easier to understand, the following specific embodiments are examples of the actual implementation of the present invention. In addition, wherever possible, the same elements, components, and steps in the drawings and embodiments are used to represent the same or similar components.

FIG. 1 is a schematic diagram of an automatic control device in accordance with an embodiment of the present invention. Referring to FIG. 1, the automatic control device 100 includes a controller 110 and motor units 120_1, 120_2~120_N, where N is a positive integer greater than 0. The controller 110 is coupled to the motor units 120_1, 120_2~120_N through a bus-bar (Bus). The motor units 120_1, 120_2 to 120_N each have a motor number set in advance. In this embodiment, when the user wishes to renumber the motor units 120_1, 120_2~120_N, the user can couple the automatic control device 100 to an external computer device so that the external computer device can read the numbering program recorded on the storage device, and can operate the controller 110 to number the motor units 120_1, 120_2~120_N.

For example, first, the user specifies a target number. Next, the controller 110 scans a plurality of motor numbers to record a plurality of rotation data of the plurality of motor units 120_1, 120_2 120 120_N corresponding to the motor numbers. While the controller 110 scans the plurality of motor numbers, the user can rotate at least one of the motor units 120_1, 120_2~120_N. Next, the controller 110 selects one of the plurality of rotation data having a rotation value satisfied a preset rotation value condition, and determines whether the rotation value of the one of the plurality of rotation data is greater than a preset threshold value. If so, the controller 110 changes the motor number of the motor unit corresponding to the rotation value satisfied the preset rotation value condition to the target number. That is to say, during the motor numbering, the user can change the motor number of the specific motor unit to the target number by rotating one or more motor units so that the numbering program can correctly lock target the specific motor unit. Also, in an embodiment, the external computer device may include a display. When the numbering program changes the motor number of the specific motor unit to the target number, the display can display the result of a motor numbering operation to allow the user to rotate the next motor unit, and to cooperate with the controller 110 to perform the motor numbering operation of the next motor unit as described above.

In more detail, the preset rotation value condition in the above embodiment may be a rotation value having a maximum value, a second large value, or other specific values. That is, the user can preset the preset rotation value condition, so that the controller 110 can automatically select the motor number of the motor unit corresponding to the rotation value satisfied the preset rotation value condition to be adjusted. In other words, the user can perform the motor numbering operation for the motor units 120_1, 120_2~120_N, and the preset rotation value condition is a largest rotation value. Therefore, the user can rotate a specific motor unit in sequence to perform the motor numbering operation of the above embodiment. In other words, in an embodiment, the motor units 120_1, 120_2~120_N of the automatic control device 100 may also constitute a joint mechanism in a pairwise manner. Therefore, when the user rotates a joint mechanism, the two rotation values of two of the motor units 120_1, 120_2~120_N may be greater than the preset threshold value. In this embodiment, if the user wants to perform the motor numbering operation described in the above embodiment by using the smaller rotation value of the two rotation values, the user can preset the preset rotation value condition to the rotation value having the second largest value, so that the controller 110 can automatically select the motor number of the motor unit corresponding to a second largest rotation value of a rotation data to be adjusted.

In this embodiment, the controller 110, for example, is a central processing unit (CPU), other general purpose or special purpose programmable microprocessor (microprocessor), digital signal processor (DSP), programmable controller, application specific integrated circuits (ASIC), programmable logic device (PLD), other similar processing circuits, or a combination of these circuits. Moreover, the external computer device described above may include a display, a processor or a storage device, and the like. The user can activate or drive the automatic control device 100 through an external computer device, and write the new motor numbering result and the corresponding control program into the automatic control device 100.

In this embodiment, the storage device may be a non-transitory computer-readable recording medium, such as a read-only memory (ROM), an erasable programmable read-only memory (EPROM), or an electrically-erasable programmable read-only memory (EEPROM), but the present invention is not limited thereto. In the present embodiment, a storage device may be configured in the automatic control device 100 or an external computer device for reading and executing by a controller 110 of the automatic control device 100 and a processor of the external computer device.

In the present embodiment, the motor units 120_1~120_N may be, for example, a smart servo motor, but the invention is not limited thereto. In the present embodiment, the motor devices 120_1~120_N can respectively receive commands from the controller 110 to perform corresponding operations. The control commands of the output of the controller 110 may be, for example, a read ID command, a set ID command, a fixed command, a relax command, a go to the target angle within a set time period command, a read target angle command, a read current rotation angle command, and a set target angle command or the like, and the present invention is not limited thereto.

Figure 2:
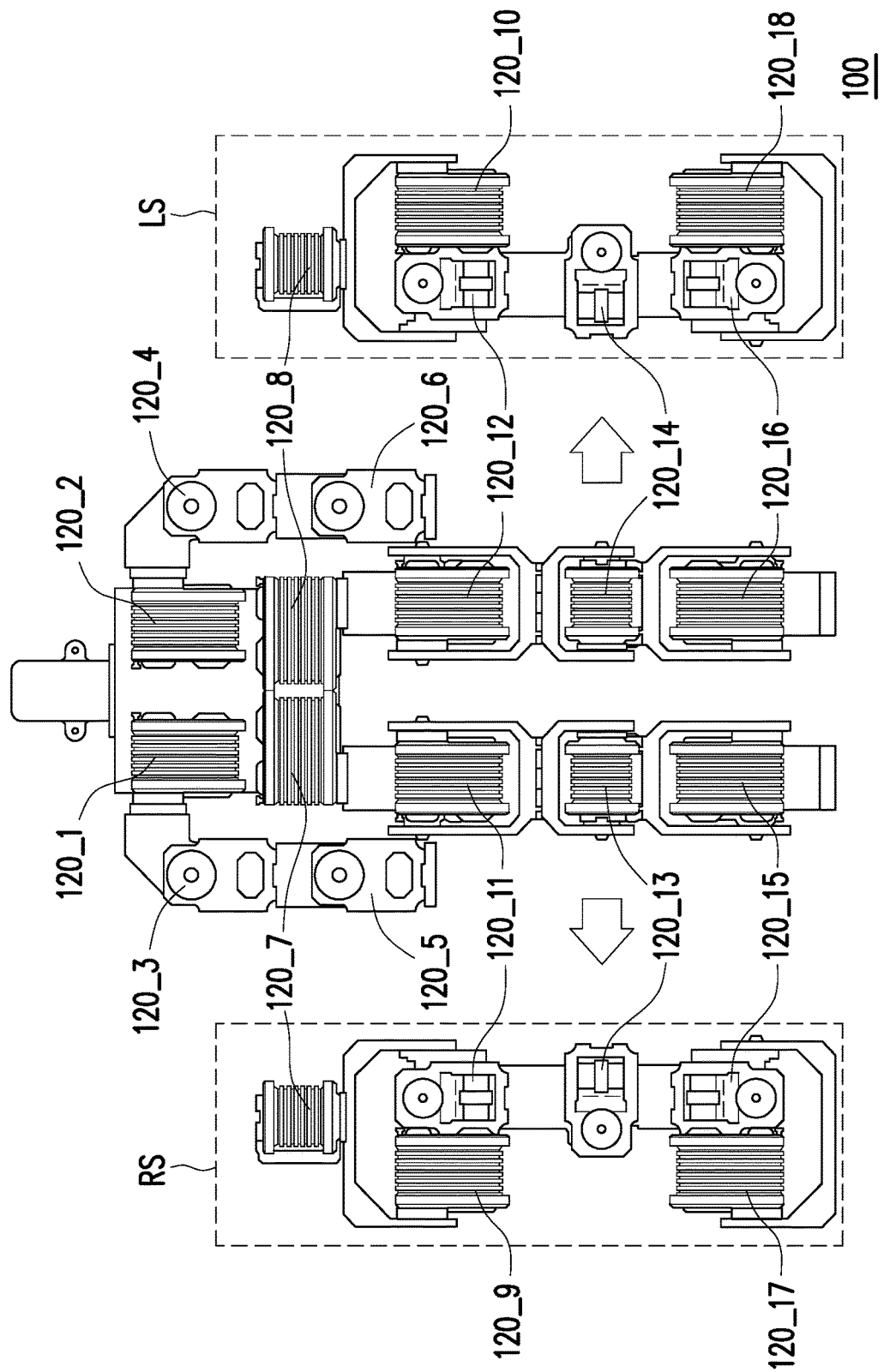
FIG. 2 is a structural diagram of the automatic control device in accordance with the embodiment of the present invention.

In order to facilitate a better understanding of a motor numbering method of the present invention for those skilled in the art, FIG. 2 is an example embodiment of a robot, and the type of the automatic control device 100 of the present invention is not limited to FIG. 2.

FIG. 2 is a structural diagram of the automatic control device in accordance with the embodiment of the present invention. Referring to FIGS. 1 and 2, the automatic control device 100 may be, for example, a robot. As shown in the front view of the robot shown in FIG. 2, the automatic control device 100 includes a plurality of motor units 120_1~420_18. Moreover, with the structural diagram of the left foot LS and the structural diagram of the right foot RS of the reference robot, each joint of the automatic control device 100 may be composed of one or more motor units. In the present embodiment, these motor units 120_1 to 120_18 have motor numbers set in advance as shown in Table 1 below. The preset motor numbers may be determined according to the assembly sequence of the different motor units, and the invention is not limited thereto.

TABLE 1

| Motor unit | Motor number |
| --- | --- |
| 120_1 | 1 |
| 120_2 | 10 |
| 120_3 | 8 |
| 120_4 | 17 |
| 120_5 | 9 |
| 120_6 | 18 |
| 120_7 | 2 |
| 120_8 | 11 |
| 120_9 | 3 |
| 120_10 | 12 |
| 120_11 | 4 |
| 120_12 | 13 |
| 120_13 | 5 |
| 120_14 | 14 |
| 120_15 | 7 |
| 120_16 | 16 |
| 120_17 | 6 |
| 120_18 | 15 |

While the user is writing the control program, if the user wants to renumber the motor units 120_1~120_18 in sequence, to write the control command of the control program, the user can preset the rotation value condition as the largest rotation value. Specifically, first, the user can first specify a target number and rotate a specific motor unit. The target number is, for example, "1", and the specific motor unit is, for example, the motor unit 120_5. Next, the controller 110 scans the motor numbers 1 to 18 in sequence to record a plurality of rotation data of the motor units 120_1 to 120_18. In detail, the controller 110 may record the angle parameters of the plurality of sets of motor shafts for each of the motor units 120_1 120 120_18, and select the maximum and minimum values of the plurality of sets of angle parameters of each of the motor units 120_1 120 120_18. The controller 110 calculates a maximum value and a minimum value of the plurality of sets of angle parameters of each of the motor units 120_1~120_18 to obtain a rotation data of each of the motor units 120_1~120_18.

That is, since the user only rotates the motor unit 120_5, the motor unit 120_5 has a larger rotation value than the other motor units 120_1~120_4, 120_6~120_18. Then, in order to avoid false positives, the controller 110 can preset the preset threshold value. When the controller 110 selects one of the plurality of rotation data having the rotation value satisfied the preset rotation value condition, the controller 110 can determine whether the rotation value is greater than the preset threshold value. Therefore, if the rotation value is greater than the preset threshold value, the controller 110 changes the motor number "9" of the motor unit 120_5 corresponding to the rotation value satisfied the preset rotation value condition to the target number "1". On the other hand, if the rotation value is not greater than the preset threshold value, the controller 110 determines that the scan is a false positive and rescans the motor units 120_1~120_18. However, it should be noted that since the target number "1" has been used by the motor unit 120_1, the controller 110 first changes motor number "1" of the motor unit 120_1 to an idle number "19" before changing the motor number "5" of the motor unit 120_5. "1". Therefore, these motor units 120_1~120_18 may have motor numbers as shown in Table 2 below after renumbering (such as underlined).

TABLE 2

| Motor Unit | Motor Number |
| --- | --- |
| 120_1 | <u>19</u> |
| 120_2 | 10 |
| 120_3 | 8 |
| 120_4 | 17 |
| 120_5 | <u>1</u> |
| 120_6 | 18 |
| 120_7 | 2 |
| 120_8 | 11 |
| 120_9 | 3 |
| 120_10 | 12 |
| 120_11 | 4 |
| 120_12 | 13 |
| 120_13 | 5 |
| 120_14 | 14 |
| 120_15 | 7 |
| 120_16 | 16 |
| 120_17 | 6 |
| 120_18 | 15 |

However, the preset rotation value condition described in this embodiment may also be set to the second largest rotation value or other specified rotation values. The preset rotation value condition described in this embodiment may be determined according to different usage needs.

Figure 3:
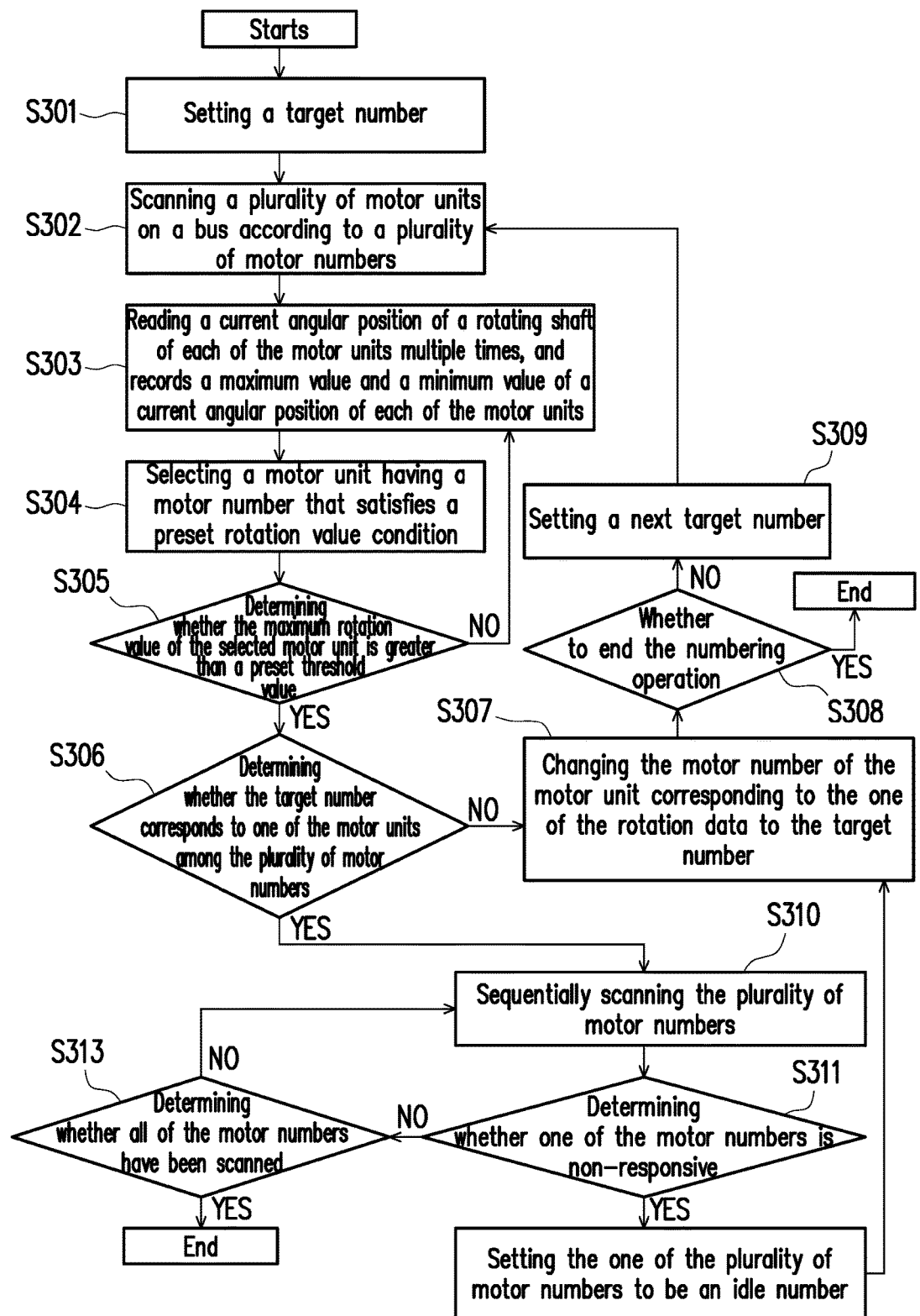
FIG. 3 is a flow chart of a motor numbering method in accordance with the embodiment of the present invention.

FIG. 3 is a flow chart of a motor numbering method in accordance with an embodiment of the present invention. Referring to FIGS. 1 through 3, the motor numbering method of the present embodiment can be applied to the automatic control device 100 of FIG. 1. From automatic control device of FIG. 1, the controller 110 performs steps S301 to S313. In step S301, the controller 110 sets a target number. In step S302, the controller 110 scans a plurality of motor units 120_1~120_N on a busbar according to a plurality of motor numbers. In step S303, the controller 110 reads a current angular position of a rotating shaft of each of the motor units 120_1~120_N multiple times, and records a maximum value and a minimum value of the current angular position of each of the motor units 120_1~120_N. In step S304, the controller 110 selects a motor number (or motor unit) corresponding to the maximum rotation value. In step S305, the controller 110 determines whether the maximum rotation value is greater than a preset threshold value. If not, the controller 110 re-executes step S303. If so, the controller 110 executes step S306.

In step S306, the controller 110 determines whether the target number corresponds to one of the motor units 120_1~120_N among the plurality of motor numbers. If so, the controller 110 performs step S310. If not, the controller 110 performs step S307. In step S310, when the controller 110 determines that the target number corresponds to one of the motor units 120_1~120_N among the plurality of motor numbers, the controller 110 scans the plurality of motor numbers one by one. In step S311, the controller 110 determines whether one of the motor numbers is non-responsive. If so, the controller 110 executes step S312 to set the motor number of the motor device that is non-responsive to an idle number. If not, the controller 110 performs step S313 to determine whether all of the motor numbers have been scanned. If not, the controller 110 re-executes step S310 to scan the next motor number. If so, the controller 110 ends a motor numbering operation.

In step S307, the controller 110 changes the motor number of the motor unit 120_1~120_N corresponding to the one of the plurality of rotation data as the target number. In step S308, the controller 110 determines whether all of the motor units 120_1~120_N have been numbered. If so, the controller 110 ends the motor numbering operation. If not, the controller 110 executes step S309 to set a next target number, and the controller 110 re-executes step S302. It should be noted that the motor numbering method of this embodiment is not limited to sequential numbering. In an embodiment, the determining condition of step S308 may be, for example, determining whether the user inputs a target number instruction to continue numbering. Alternatively, in another embodiment, the method of setting the next target number in step S308 is to sequentially specify an odd group or an even group of the motor numbers, by corresponding a part of the motor units 120_1~120_N to the odd motor numbers, and by corresponding the other part of the motor units 120_1~120_N to the even motor numbers. Therefore, the motor numbering method of the present embodiment can provide a convenient and effective numbering effect.

For example, taking the robot of FIG. 2 as an example, and in conjunction with the Table 1 above, in step S301, the controller 110 receives a setting instruction of the user to set the target number. For example, the user desires to number "1" to "18" in the following sequence: motor unit 120_5, motor unit 120_3, motor unit 120_1, motor unit 120_7, motor unit 120_9, motor unit 120_11, motor unit 120_13, motor unit 120_17, motor unit 120_15, motor unit 120_6, motor unit 1204, motor unit 120_2, motor unit 120_8, motor unit 120_10, motor unit 120_12, motor unit 120_14, motor unit 120_18, and motor unit 120_16. First, the target number is "1". In step S302, the controller 110 scans the motor units 120_1~120_18 on the busbar in accordance with the motor numbers "1" to "18". At the same time, the user rotates motor unit 120_5. In step S303, the controller 110 reads the current angular position of the rotating shaft of each of the motor units 120_1~120_18 a plurality of times, and determines the maximum value and the minimum value of the current angular positions of each of the motor units 120_1~120_18. In step S304, the controller 110 selects the motor unit 120_5 with the maximum rotation value, wherein the rotation value represents a difference value between the maximum value and the minimum value of the angular position. In step S305, the controller 110 determines whether the maximum rotation value is greater than the preset threshold value. If so, the controller proceeds to step S306. If not, the controller re-executes step S303.

In step S306, the controller 110 determines whether the target number "1" corresponds to one of the motor units 120_1~120_18 among the motor numbers "1" to "18". If so, the controller 110 executes steps S310 to S313 to modify the occupied motor number to an idle number. If not, the controller 110 performs step S307. In the present embodiment, since the target number "1" is occupied by the motor unit 120_1, the controller 110 performs steps S310 to S313. In step S310, the controller 110 sequentially scans the motor numbers "1" to "20" (assuming that the upper limit of the motor number is "20"). In step S311, the controller 110 determines whether the motor number "1" is non-responsive, wherein non-responsive means that the motor number "1" is not used. However, in the present embodiment, the controller 310 determines that the motor unit 120_1 corresponding to the motor number "1" has generated a response, and therefore performs step S313.

In step S313, the controller 110 determines whether all of the motor numbers "1" to "20" have been scanned. If so, the controller 110 ends the numbering. If not, the controller 110 re-executes step S310 to successively scan the next motor number "2". Until the controller 110 scans the motor number "19", the controller 310 determines that the motor number "19" is non-responsive, and the controller 310 performs step S312. In step S312, the controller 110 determines that the motor number "19" is not used, and therefore sets the motor number "19" as the idle number, and the controller 110 executes step S307.

In step S307, if the one of the rotation data having the rotation value satisfied the preset rotation value condition corresponds to motor unit 120_5, the controller 110 changes motor number "9" of the motor unit "5" to the target number "1". Next, the controller 110 performs step S308 to determine whether or not to end the motor numbering operation. In this example, the controller 110 determines the motor numbering operation has not been completed and executes step S309 to set the next target number to "2". The described step S302 above is re-executed until all of the motor units 120_1~120_N are renumbered. By analogy, the user rotates each of the motor units 120_1~120_18 such that after renumbering the motor units 120_1~120_18, they may have motor numbers as shown in Table 3 below.

TABLE 3

| Motor Unit | Motor Number |
| --- | --- |
| 120_1 | 3 |
| 120_2 | 12 |
| 120_3 | 2 |
| 120_4 | 11 |
| 120_5 | 1 |
| 120_6 | 10 |
| 120_7 | 4 |
| 120_8 | 13 |
| 120_9 | 5 |
| 120_10 | 14 |
| 120_11 | 6 |
| 120_12 | 15 |
| 120_13 | 7 |
| 120_14 | 16 |
| 120_15 | 9 |
| 120_16 | 18 |
| 120_17 | 8 |
| 120_18 | 17 |

In addition, other device features and implementation details of the automatic control device 100 according to the present embodiment can be sufficiently taught, suggested, and implemented according to the described embodiments of FIG. 1 to FIG. 2 above, and thus will not be repeated.

Figure 4:
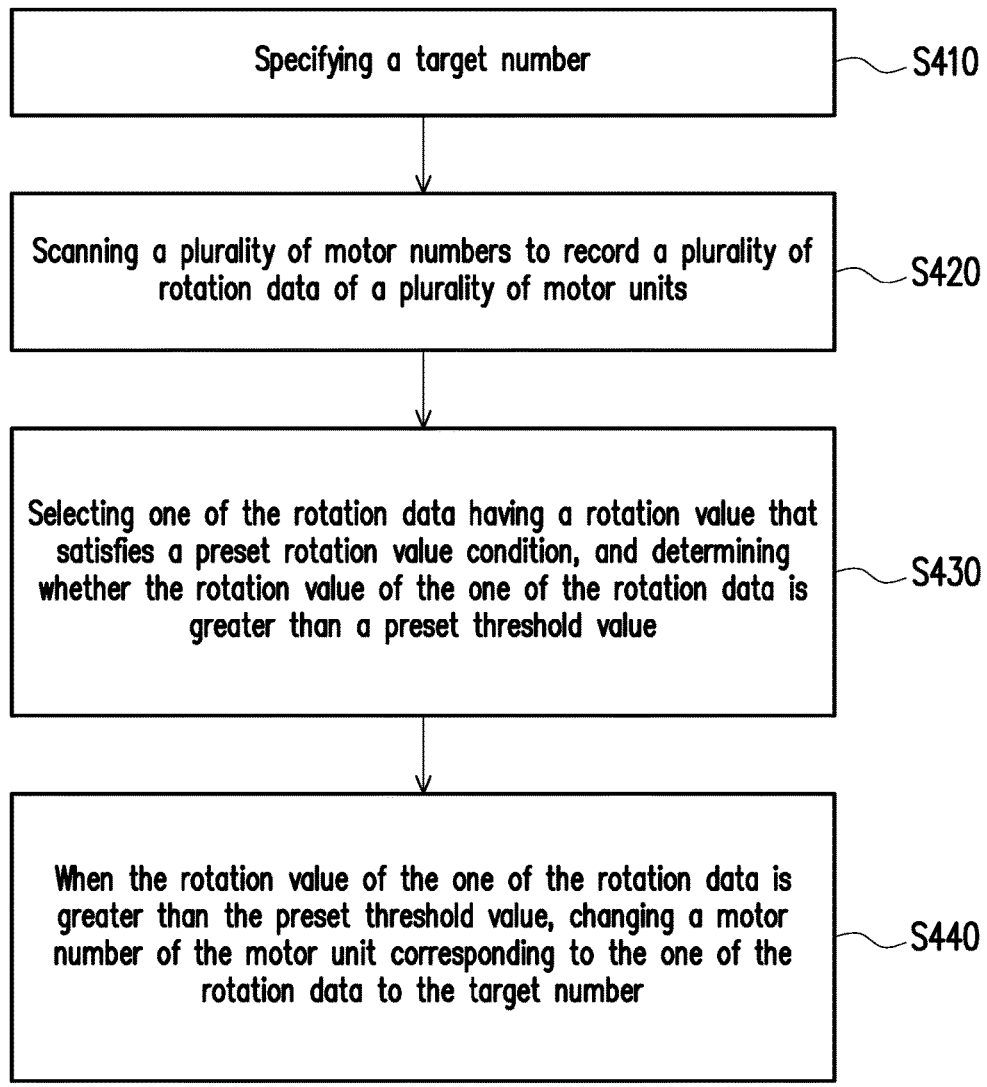
FIG. 4 is a flow chart of a motor numbering method in accordance with another embodiment of the present invention.

FIG. 4 is a flow chart of a motor numbering method in accordance with another embodiment of the present invention. Referring to FIGS. 1 and 4, the motor numbering method of the present embodiment can be applied at least to an automatic control device 100 of the embodiment of FIG. 1. In step S410, the controller 110 specifies a target number. In step S420, the controller 110 scans a plurality of motor numbers to record a plurality of rotation data of a plurality of motor units 120_1, 120_2~120_N. In step S430, the controller 110 selects one of the rotation data having a rotation value satisfied a preset rotation value condition, and determines whether the rotation value of the one of the rotation data is greater than the preset threshold value. In step 440, when the rotation value of the one of the rotation data is greater than the preset threshold value, the controller changes a motor number of the motor unit corresponding to the one of the rotation data to the target number. Therefore, the motor numbering method of the present embodiment can provide a convenient motor numbering effect and can correctly number a specific motor unit.

It should be noted that the preset rotation value condition in the above embodiment may be a rotation value having a maximum value, a second large value, or other specific values. The user can preset the preset rotation value condition so that the controller 110 can automatically select one of the rotation data to have the motor number of the motor unit corresponding to the rotation value corresponding to the preset rotation value condition to be changed.

In addition, other device features and implementation details of the automatic control device 100 according to the present embodiment can be sufficiently taught, suggested, and implemented according to the described embodiments of FIG. 1 to FIG. 3 above, and thus will not be repeated.

In summary, the motor numbering method, the automatic control device, and the recording medium of the present invention enables the automatic control device to perform the motor numbering operation, and the user only needs to rotate one or more motor units to change the motor number of the specific motor unit to the target number during the numbering operation of the automatic control device. In addition, during the numbering operation of the automatic control device, if the target number has already been occupied by the specific motor unit, the automatic control device may first change the motor number of the specific motor unit to the idle number so that the numbering operation can be performed correctly. Therefore, the motor numbering method, the automatic control device, and the recording medium of the present invention can provide a convenient and efficient motor numbering effect.

Although the present invention has been disclosed in the above embodiments, it is not intended to limit the invention, and it is to be understood that the invention may be practiced without departing from the spirit and scope of the invention. Therefore, the scope of the invention is defined by the scope of the appended claims.

What is claimed is:

1. A motor numbering method, adapted to number a plurality of motor units of an automatic control device, wherein the motor numbering method comprises:
   specifying a target number;
   scanning a plurality of motor numbers to record a plurality of rotation data of the plurality of motor units;
   selecting one of the plurality of rotation data having a rotation value satisfied a preset rotation value condition, and determining whether the rotation value of the one of the plurality of rotation data is greater than a preset threshold value; and
   changing a motor number of a motor unit corresponding to the one of the plurality of rotation data to the target number when the rotation value of the one of the plurality of rotation data is greater than the preset threshold value.

2. The motor numbering method according to claim 1, further comprising:
   rescanning the plurality of motor numbers when the rotation value of the one of the plurality of rotation data is not greater than the preset threshold value.

3. The motor numbering method according to claim 1, further comprising:
   determining whether the target number corresponds to one of the plurality of motor units among the plurality of motor numbers;
   when the target number corresponds to the one of the plurality of motor units among the plurality of motor numbers, changing the motor number of the one of the plurality of motor units to an idle number.

4. The motor numbering method according to claim 3, further comprising:
   sequentially scanning the plurality of motor numbers, and determining the one of the plurality of motor number as the idle number when the one of the plurality of motor numbers is non-responsive.

5. The motor numbering method according to claim 1, wherein the step of specifying the target number comprises:
   receiving a target number instruction to specify the target number.

6. The motor numbering method according to claim 1, wherein the step of specifying the target number comprises:
   sequentially specifying the plurality of motor numbers as the target number.

7. The motor numbering method according to claim 1, wherein the step of specifying the target number includes:
   sequentially specifying the plurality of motor numbers of an odd group or an even group as the target number.

8. An automatic control device, comprising:
   a plurality of motor units; and
   a controller, coupled to the plurality of motor units, wherein the controller specifies a target number and scans a plurality of motor numbers to record a plurality of rotation data of the plurality of motor units,
   wherein the controller selects a rotation value that satisfies a preset rotation value condition from one of the plurality of rotation data, and determines whether the rotation value from the one of the plurality of rotation data is greater than a preset threshold value,
   and when the rotation value from the one of the plurality of rotation data is greater than the preset threshold value, the controller changes a motor number of a motor unit corresponding to the one of the plurality of rotation data to the target number.

9. The automatic control device according to claim 8, wherein when the rotation value from the one of the plurality of rotation data is not greater than the preset threshold value, the controller rescans the plurality of motor numbers.

10. The automatic control device according to claim 8, wherein the controller determines whether the target number corresponds to one of the plurality of motor units among the plurality of motor numbers, and when the target number corresponds to the one of the plurality of motor units among the plurality of motor numbers, the controller changes the motor number of the one of the plurality of motor units to an idle number.

11. The automatic control device according to claim 10, wherein the controller sequentially scans the plurality of motor numbers, when one of the plurality of motor numbers is non-responsive, the controller determines that the one of the plurality of motor numbers is the idle number.

12. The automatic control device according to claim 8, wherein the controller receives a target number instruction to specify the target number.

13. The automatic control device according to claim 8, wherein the controller sequentially specifies the plurality of motor numbers as the target number.

14. The automatic control device according to claim 8, wherein the controller sequentially specifies an odd group or an even group of the plurality of motor numbers as the target number.

15. A non-transitory computer readable recording medium, comprising a program for reading by a controller of the automatic control device to perform a motor numbering operation, wherein the motor numbering operation comprises:
   specifying a target number;
   scanning a plurality of motor numbers to record a plurality of rotation data of the plurality of motor units;
   selecting one of the plurality of rotation data having a rotation value satisfied a preset rotation value condition, and determining whether the rotation value of the one of the plurality of rotation data is greater than a preset threshold value; and
   changing a motor number of a motor unit corresponding to the one of the plurality of rotation data to the target number when the rotation value of the one of the plurality of rotation data is greater than the preset threshold value.

* * * * *